United States Patent

[11] 3,543,619

| [72] | Inventors | Ernest W. Hellmer<br>Chicago;<br>Alfred G. Down, Wood Dale, Illinois |
|---|---|---|
| [21] | Appl. No. | 691,308 |
| [22] | Filed | Dec. 18, 1967 |
| [45] | Patented | Dec. 1, 1970 |
| [73] | Assignee | Continental Can Company, Inc.<br>New York, New York<br>a corporation of New York |

[54] APPARATUS FOR DEFLASHING AND DEBURRING PLASTIC PRODUCTS
13 Claims, 7 Drawing Figs.

[52] U.S. Cl. .................................................. 83/24, 18/2, 18/5B, 83/53, 83/98, 83/177, 264/161
[51] Int. Cl. ....................................................... B26d 7/06, B26f 3/06
[50] Field of Search ......................................... 83/177, 914, 53, 15, 16, 24, 98, 170; 264/161, 80; 18/2, 5(BS)

[56] References Cited
UNITED STATES PATENTS

| 2,967,326 | 1/1961 | Collins et al. | 264/161X |
| 3,136,649 | 6/1964 | Keahey, Jr. | 83/177X |

FOREIGN PATENTS

| 1,102,469 | 2/1968 | Great Britain | 83/53 |

*Primary Examiner*—Andrew R. Juhasz
*Assistant Examiner*—James F. Coan
*Attorney*—Diller, Brown, Ramik & Holt

ABSTRACT: This disclosure is directed to a novel apparatus for removing flash or flash material from a molded plastic product after it has been removed from a mold, and is particularly directed to a mechanism which includes a nozzle having an orifice contoured to the general outline of the flash which is to be removed from a molded plastic product. The nozzle is effective for contouring hot air to the general profile of the flash which is to be removed, and upon directing the hot air against the flash the latter is totally removed from and/or smoothed against the surface of the product. Means are additionally provided for preventing the product from being distorted, deformed or otherwise adversely affected by the hot air during the deflashing operation.

Patented Dec. 1, 1970
3,543,619
Sheet 1 of 2
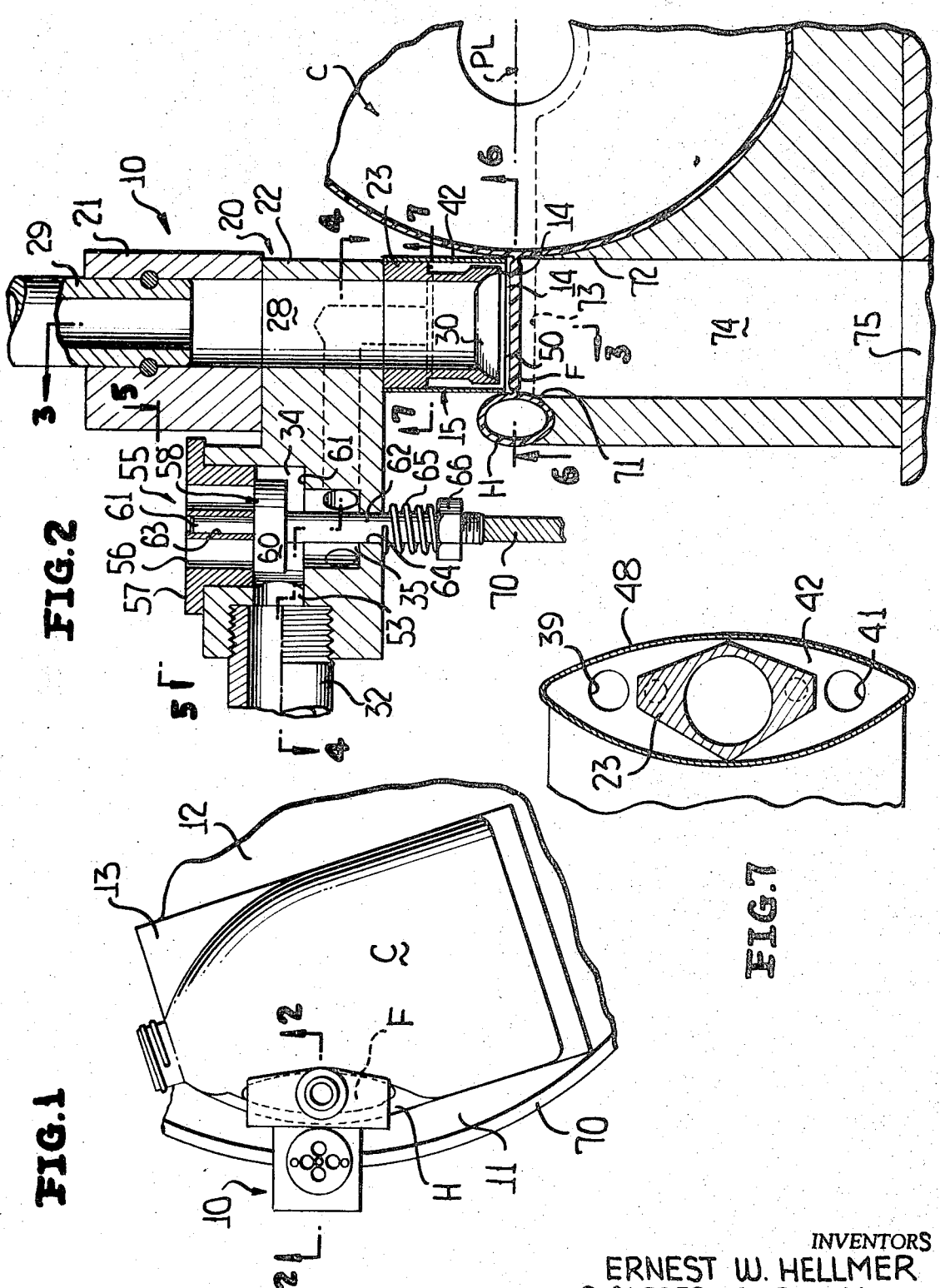
INVENTORS
ERNEST W. HELLMER
& ALFRED G. DOWN
BY Mason, Porter, Diller & Brown
ATTORNEYS

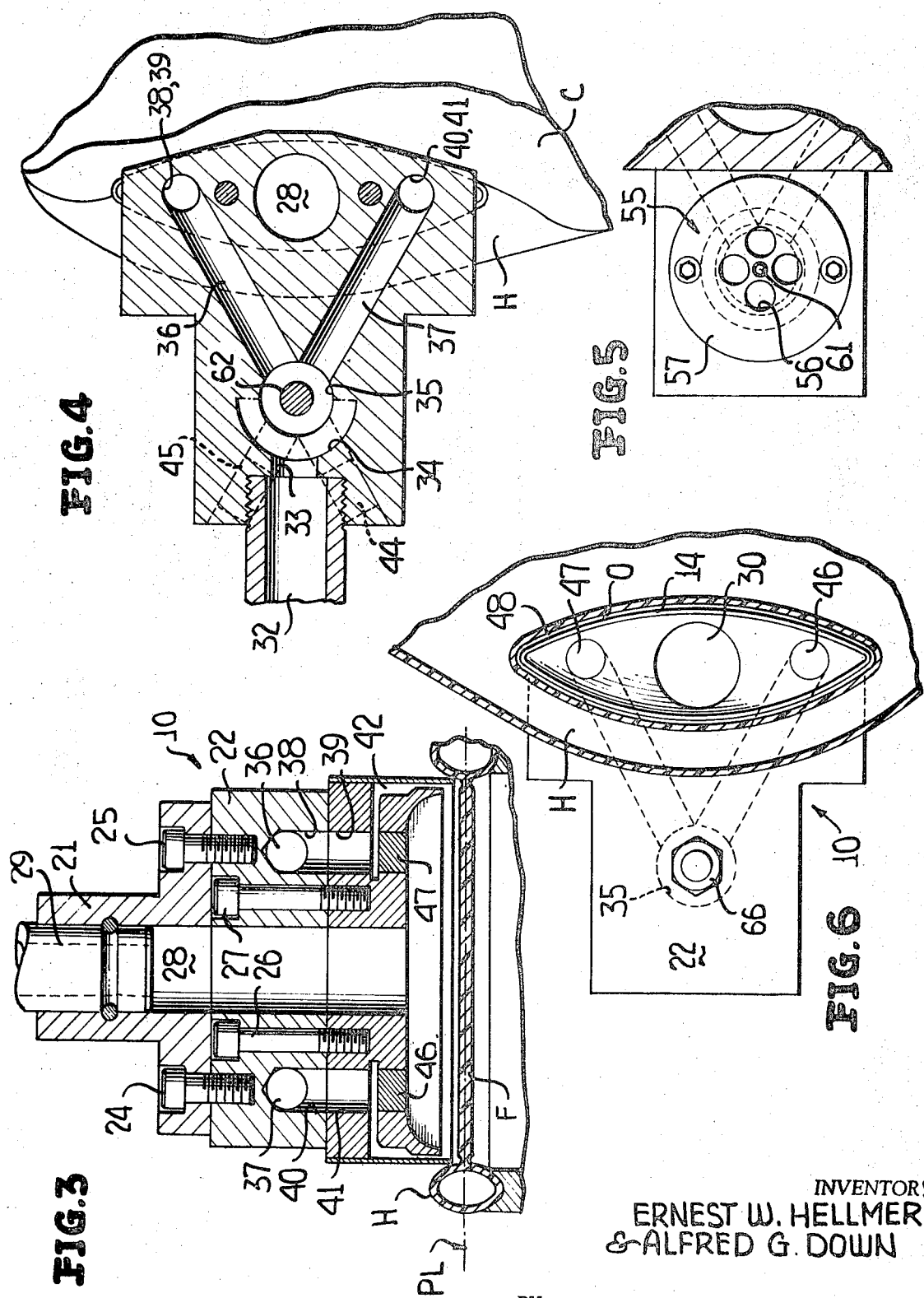

APPARATUS FOR DEFLASHING AND DEBURRING PLASTIC PRODUCTS

A known method of molding plastic products that is used extensively to manufacture plastic containers, such as bottles, jugs and other hollow objects, is carried out by enclosing a hot section of tubular plastic in a conventional split-mold of a blow molding machine. A cavity in each half of the split-mold is concavely contoured to the semicylindrical configuration of the desired plastic product. A plane through the parting surfaces of the halves of the split-mold generally passes axially through the split-mold and the product formed thereby The tubular piece of plastic material is generally formed by extruding, and as the tube emerges from an extruder it is enclosed within the cavity of the split-mold after which the split-mold is closed and air under pressure is injected into the extruded tube in a known manner to cause the tube to conform to the configuration of the split-mold cavity.

There are often portions of the split-mold which are actually smaller than the tube of plastic material being enclosed in the mold. For example, in the manufacture of large containers with a narrow neck the finished neck portion of the container may have a smaller diameter than the tube. This is necessary to provide an adequate wall thickness in the body of the container after the hot plastic has been inflated to conform to the contour of the mold. The excess plastic material is pinched off when the mold closes on the neck area, but a thin film extending substantially at right angles to the neck portion of the container remains at the parting line of the mold. The abutting surfaces of the split-mold are usually kept rather narrow in this area and the bulk of the excess material is forced outward from the neck portion of the container but still remains attached thereto. This excess material is known as flash, or flash material, or simply as a line of flash, and it is important that it remain initially attached to the molded product so that it will be removed from the mold as an integral unit. In this way portions of the flash do not become separated from the main body of the plastic product. This is particularly important in continuous blow molding operations where the loose scrap material could seriously affect the smooth operation of the machine. After the molded plastic article is removed from the split-mold, the flash is generally removed by a cutting, trimming or severing operation. Frequently this flash is torn off by hand. When the flash is severed or torn off the plastic product the surface is rough and burred along the line where the severing, trimming or tearing took place.

A typical example of one area from which flash material is removed is the area within the hand opening of jug-type containers. When such containers are molded the clamped-off tubular section is compressed within the area of what is eventually the hand opening of the jug. After the jug has been blow-molded and removed from a mold it is necessary to remove this generally oval-shaped area of flash material to form the hand opening, and upon the removal thereof by many conventional mechanisms a rough burr remains along the line where the severing, trimming or similar conventional tearing takes place.

Heretofore it has been common procedure to attempt to remove the flash at the parting line by maintaining close tolerances during the trimming operation, but this has never been completely satisfactory because the containers emerging from a blow-molding line come from a number of molds which, while they are on casual examination identical, actually have some minute differences due to wear, as well as due to the inability of skilled craftsmen to manufacture two molds exactly alike. In addition to this variation the containers coming from the same die may vary as the temperature of the extrusion operation fluctuates, the ambient air temperature, as well as other variations caused by differences in the plastic material being extruded. Therefore, the trimming operation while partially satisfactory is not capable of producing a smooth surface at the product parting line or any line from which flash must be removed.

Other attempts to remove the flash by the use of soft abrasives have been found to be unsatisfactory because of the dust involved, and flash removal by hand-cutting is, of course, not practical on a continuous high-production scale.

There are also instances when the flash of the product may not be trimmed when the plastic tube from which the product is molded is smaller in diameter than the smallest portion of the split-mold or when the product is injection-molded. In such cases the flash nevertheless presents an irregular rough surface projecting outwardly of the surface of the product along the parting line, and the removal of the flash to form a smooth, integral exterior surface along the parting line is highly desirable.

It is, therefore, a primary object of this invention to provide a novel mechanism for removing flash material or flash lines on the surface of a molded plastic product, particularly a container, by providing a nozzle having an orifice contoured to the general profile of the flash which is to be removed, whereby upon directing hot air through the orifice for impingement against the like-contoured flash the latter is removed from and/or smoothed against the surface of the product.

A further object of this invention is to provide a novel mechanism of the type heretofore described wherein means are provided for preventing the heated air from impinging against portions of the product other than the portions to which the flash is attached thereby preventing the product from being distorted, deformed or otherwise adversely affected by the heated air, as could otherwise occur.

Yet another object of this invention is to provide a novel method of removing flash by impinging heated air against the flash in accordance with the operation of a mechanism constructed in the manner heretofore noted, as well as other equivalent and nonequivalent mechanisms.

With the above and other objects in view that will hereinafter appear, the nature of the invention will be more clearly understood by reference to the following detailed description, the appended claimed subject matter, and the several views illustrated in the accompanying drawings.

In the drawing:

FIG. 1 is a fragmentary top perspective view of a deflashing mechanism constructed in accordance with this invention, and illustrates a plastic container positioned with a generally oval-shaped area of flash material between the container body and handle disposed in alinement with a like contoured orifice of a hot-air-emitting nozzle.

FIG. 2 is an enlarged fragmentary sectional view taken generally along line 2–2 of FIG. 1, and more clearly illustrates the alinement of the orifice with the outer outline of the flash material, and the manner in which hot air directed through the orifice impinges against, melts and causes the removal of the flash material.

FIG. 3 is a sectional view taken generally along line 3–3 of FIG. 2, and illustrates a plurality of ports for introducing hot air into a chamber leading to the orifice, and an axial bore adapted for communication with a source of vacuum.

FIG. 4 is a fragmentary sectional view taken generally along line 4–4 of FIG. 2, and illustrates a valve mechanism for controlling the flow of hot air to and through the nozzle.

FIG. 5 is a fragmentary sectional view taken generally along line 5–5 of FIG. 2, and illustrates means for bypassing the hot air to atmosphere.

FIG. 6 is a fragmentary sectional view taken generally along line 6–6 of FIG. 2, and more clearly illustrates the manner in which the nozzle orifice is contoured to the outline of the flash which is removed to form the handle opening.

FIG. 7 is a cross-sectional view taken generally along line 7–7 of FIG. 2, and illustrates a pair of ports and a chamber in fluid communication with the nozzle orifice.

A novel deburring mechanism constructed in accordance with this invention is generally designated by the reference numeral 10, and one or more such mechanisms are supported about the periphery 11 of a conventional turntable or turret 12 carrying a plurality of container supports or jigs 13, only one of which is illustrated in the drawings. The function of each of the jigs 13 is to accurately locate a molded plastic product, such as a container C, with a generally oval-shaped area of flash F in alinement with a like contoured orifice 14 of an air nozzle 15 of the mechanism 10. When the turret 12 is indexed in a conventional manner to a stationary position with the orifice 14 alined with the flash material F, means (not shown) are actuated for moving the mechanism 10 downwardly to actuate a valve mechanism, which will be described more fully hereafter, causing hot air from a suitable source to pass through the orifice 14, impinge against and melt the flash F along its exterior outline, and thereby form a handle opening O (FIG. 6) between the now-formed handle H and the container body (unnumbered). In this manner the entire piece of flash F is removed and the line along which the flash was joined to the container body and handle is completely smooth.

Referring now particularly to FIGS. 2 and 3 of the drawings, the deflashing mechanism 10 includes a body 20 defined by three metallic elements 21 through 23 which are joined to each other by a plurality of bolts 24 through 27 in the manner clearly illustrated in FIG. 3 of the drawings. The elements 21 through 23 have coaxially disposed bores (unnumbered) which collectively form a passage 28 having one end (unnumbered) placed in fluid communication with a vacuum source, such as a vacuum pump, by a conduit 30. An opposite end of the passage 28 terminates in an orifice 30 which is disposed inwardly of the orifice 14 and is similarly contoured to a generally oval-shaped configuration. The function of the particular shape of the orifice 30 and the vacuum drawn upwardly therethrough as viewed in FIG. 2 is to prevent an oval-shaped stream S of heated air impinging against the flash F from being directed against adjacent surfaces of the handle H and the container body B during a deflashing operation. For example, as the hot air stream S initially impinges against the upper surface (unnumbered) of the flash F the stream would tend to be deflected upwardly and outwardly unless otherwise provided for, and the vacuum drawn through the orifice 30 functions to instead draw the hot air inwardly and upwardly as viewed in FIG. 2 to prevent the stream from impinging against, deforming, distorting or otherwise adversely affecting nonflash carrying portions of the container C. Likewise, as the flash F falls from its normal position a small area beneath the parting PL (FIG. 2) might be otherwise overheated, and the vacuum drawn through the orifice 30 similarly prevents this occurrence. Thus, the orifice 30 functions as one of two means for preventing the contoured stream S of hot air from impinging against other than the flash-carrying portion of the container C thereby preventing the container from being adversely affected by the hot air or any such other suitable fluid medium.

The stream S of hot air is directed against the flash F by the orifice 14, in the manner heretofore noted from a source (not shown) of hot air. The hot air is conducted to the orifice 14 by means of a conduit 32 (FIGS. 2 and 4), a port 33 (FIG. 2) in the element 22, a circular valve chamber 34, an adjacent circular chamber 35, a pair of passages 36, 37 (FIG. 4), a pair of ports 38, 39 and 40, 41 (FIG. 3) associated with the respective passages 36, 37, and a chamber 42 (FIGS. 3 and 7) between the ports 39, 41 and the orifice 14. The passages 36, 37 are formed simply by drilling the element 22 to intersect the chambers 34, 35 as best shown in FIG. 4, and suitable plugs 44, 45 (FIG. 4) are driven into the left end of the respective passages 36, 37 to close the same to atmosphere. The ports 38 through 40 are similarly formed by merely drilling the elements 22, 23 as best shown in FIG. 3, after which plugs 46, 47 are driven into the element 23 as shown in FIG. 3. The chamber 42 is formed by contouring the element 23 to its desired external configuration, sawing the same normal to the axis of the passage 28 to communicate with the ports 39, 41, and thereafter welding or otherwise securing an oval-shaped plate 48 to the exterior of the element 23, it being noted that in the operative position of the mechanism 10 a lowermost oval-shaped edge 50 of the plate 48 is spaced slightly above the parting line PL of the container C. In this manner hot air can be directed along the flow path heretofore described for impinging against and removing the flash F.

Means 55 in the form of a valve mechanism carried by the element 22 of the body 20 is provided for selectively directing hot air to and through the orifice 14 or cutting off the flow of hot air to the orifice 14 and directing the same to atmosphere through a plurality (four) of ports 56 formed in a flanged member 57 which is press-fit in an upper portion of the valve chamber 34. A valve 58 of the mechanism 55 includes a valve head 60 which is guided for vertical reciprocal movement by oppositely directed stems 61, 62 received in axially alined bores 63, 64, respectively, of the member 57 and the element 22. A spring 65 positioned between a nut 66 threaded upon the exposed end of the stem 62 and the under surface (unnumbered) of the element 22 normally urges the valve head 60 downwardly and into sealing seating engagement upon an annular valve seat 67 between the chambers 34, 35. In this latter-noted position hot air introduced into the chamber 34 through the conduit 32, and the port 33 is directed to atmosphere through the ports 56. In this same position the hot air cannot, of course, pass beyond the valve seat 67. Upon the unseating of the valve head 60 and the upward movement thereof the ports 56 are closed while the ports 36, 37 are open thus permitting the flow of the hot air as heretofore noted for impingement against the flash F through the contoured orifice 14.

The valve 56 is actuated automatically during the downward descent of the mechanism 10 after the orifice 14 has been accurately alined with the flash F. As the mechanism 10 descends the end face of the exposed end of the stem 62 contacts an annular plate 70 forming a portion of the turret 12 causing the valve head 60 to become stationary while the mechanism 10 continues to descend, thereby resulting in the unseating of the valve head 60 from the valve seat 67 and the impingement of the stream S against the flash F just as the lower edge 50 of the plate 48 is positioned slightly above the parting line PL of the container C. Upward retracting movement of the mechanism 10 likewise automatically results in the seating of the valve head 60 upon the valve seat 67 under the influence of the spring 65, thereby cutting off the stream S and directing the hot air to atmosphere through the ports 56.

In addition to the vacuum drawn through the orifice 30 for preventing indiscriminate impingement of the hot air against the container C, each of the jigs 13 carried by the turret 12 are so contoured as to additionally prevent such undesired hot air impingement. In particular, arcuate surfaces 71, 72 which matingly receive the lower surfaces of the handle H and the container body B in the manner clearly illustrated in FIG. 2 are extended to a point terminating just below the parting line PL. The surfaces 71, 72 thus terminate at an uppermost thin edge portion 73 which is likewise of an oval-shaped configuration and effectively shields innermost surface portions of the handle and container body from the hot air stream S, as is readily apparent from FIGS. 2 and 6 of the drawings.

As the flash F is removed from each container C the force of the flowing stream of air directs the same downwardly, as viewed in FIG. 2 of the drawings, through a discharge opening 74 of each jig 13 and an alined discharge opening 75 of the turret 12 opening through the underside thereof. Therefore, the stream S not only removes the flash F but augments the gravity-discharge of each of the removed portions of the flash material. The resulting handle opening O is completely smooth and burr-free along the parting line PL, and when the flash F is removed in the manner heretofore described container and handle distortion is precluded.

While a preferred form of the mechanism 10 has been described heretofore, as well as the operation thereof, variations in both will become apparent to those skilled in the art after having become acquainted with this disclosure, and such variations are considered to be encompassed hereby. For example, while the orifice 14 is of a continuous unbroken oval-shaped configuration, this orifice may, if desired, be formed by a plurality of arcuate slots or closely spaced openings which in effect contour the stream S to the configuration of the flash which is to be removed. Furthermore, while the invention has been described in conjunction with the removal of an oval-shaped piece of flash, it is to be understood that the configuration and application of the mechanism 10 can be appropriately modified within the scope of this invention to remove all shapes and sizes of flash material whether internally of the general outline of the particular molded product under consideration or along the exterior thereof. For example, the exterior outline of the handle H in FIGS. 4 and 6 is generally of a shallow C-shaped configuration and if flash were located therealong it is considered within the scope of this invention to modify the nozzle 15 or construct a nozzle such that the corresponding orifice 14 would be likewise of a complementary shallow C-shaped configuration whereupon the flash could be removed in the manner heretofore described. In other words, this invention is considered to embrace the removal and/or smoothing of flash, flash material, and/or flash lines anywhere upon any article molded from polymeric or copolymeric plastic material.

While preferred forms and arrangement of parts have been shown in illustrating the invention, it is to be clearly understood that various changes in details and arrangement of parts may be made without departing from the spirit and scope of the invention as defined in the appended claimed subject matter.

We claim:

1. A mechanism particularly adapted for removing and/or smoothing flash on a portion of a molded plastic product comprising means for supplying a heated flowing fluid medium, means for contouring the heated flowing fluid medium to a narrow width outline flow corresponding to the general profile of the flash-carrying portion of the molded plastic product, and means for relatively positioning the flash-carrying portion of the molded plastic product in complementary adjacent alinement with said contouring means whereby the contoured heated medium impinges against the like-contoured flash causing the removal from and/or smoothing thereof with the surface of the product.

2. The mechanism as defined in claim 1 including other flowing fluid means for substantially preventing the contoured heated fluid medium from impinging against portions of the product other than the flash-carrying portion thereby preventing the product from being distorted, deformed or otherwise adversely affected by said heated fluid medium.

3. A mechanism particularly adapted for removing and/or smoothing flash on a portion of a molded plastic product comprising means for contouring a heated flowing fluid medium to the general profile of the flash-carrying portion of the molded plastic product, and means for relatively positioning the flash-carrying portion of the molded plastic product in complementary adjacent alinement with said contouring means whereby the contoured heated medium impinges against the like-contoured flash causing the removal from and/or smoothing thereof with the surface of the product, said contouring means being effective for directing the heated fluid medium along a first flow path in a first direction, and means for substantially preventing the heated fluid medium from impinging against portions of the product being treated other than the flash-carrying portion, said preventing means including means for redirecting at least a portion of the fluid medium from the first flow path to a second flow path directed away from the flash-carrying and adjacent portions of the product thereby preventing the impingement of the heated fluid medium against such adjacent portions and the otherwise attendant deformation thereof.

4. The mechanism as defined in claim 3 wherein said preventing means also includes covering means for shielding surface portions of the product adjacent the flash-carrying portion.

5. The mechanism as defined in claim 1 wherein said fluid medium contouring means is a nozzle, and said nozzle includes orifice means of the peripheral type contoured to the desired contour of the fluid medium passing therethrough.

6. A mechanism particularly adapted for removing and/or smoothing flash on a portion of a molded plastic product comprising means for contouring a heated flowing fluid medium to the general profile of the flash-carrying portion of the molded plastic product, and means for relatively positioning the flash-carrying portion of the molded plastic product in complementary adjacent alinement with said contouring means whereby the contoured heated medium impinges against the like-contoured flash causing the removal from and/or smoothing thereof with the surface of the product, means for substantially preventing the contoured heated medium from impinging against portions of the product other than the flash-carrying portion thereby preventing the product from being distorted, deformed or otherwise adversely affected by said heated medium, said fluid medium contouring means is a nozzle, said nozzle including first orifice means contoured to the desired contour of the fluid medium passing therethrough, and said preventing means including second orifice means positioned inwardly of said first orifice means and being adapted for communication with a source of negative pressure whereby the fluid medium passing beyond said first orifice means in a first direction is at least partially redirected in a second direction opposite said first direction.

7. A method of finishing a molded plastic product by removing and/or smoothing flash on a portion thereof comprising the steps of supplying a heated flowing fluid medium, contouring the heated flowing fluid medium to a narrow width outline flow corresponding to the general profile of the flash-carrying portion of the molded plastic product, and impinging the contoured fluid medium against the like-contoured flash whereby the flash is heated to a temperature sufficient to soften the plastic material causing the removal from and/or the smoothing thereof with the surface of the product.

8. The method as defined in claim 7 including the step of preventing the contoured heated medium from impinging against portions of the product other than the flash-carrying portion by covering portions of the product adjacent the flash-carrying portion.

9. The method as defined in claim 7 including the steps of initially directing the fluid medium in a first direction for impinging against the flash, and redirecting at least a portion of the fluid medium away from the first flow path and the flash-carrying portion whereby the remaining fluid medium continuing in said first direction is prevented from impinging against the product which could otherwise deform the same.

10. The method as defined in claim 7 of discharging the removed flash upon its removal from the product under the influence of the force created by flowing fluid medium.

11. The method as defined in claim 8 including the steps of initially directing the fluid medium in a first direction for impinging against the flash, and redirecting at least a portion of the fluid medium away from the first flow path and the flash-carrying portion whereby the remaining fluid medium continuing in said first direction is prevented from impinging against the product which could otherwise deform the same.

12. The method as defined in claim 8 of discharging the removed flash upon its removal from the product under the influence of the force created by flowing fluid medium.

13. The method as defined in claim 9 of discharging the removed flash upon its removal from the product under the influence of the force created by flowing fluid medium.